United States Patent [19]

Shaw

[11] 4,365,877
[45] Dec. 28, 1982

[54] FIELD FLATTENER LENS ELEMENT ASSEMBLY

[75] Inventor: William C. Shaw, Streetsville, Canada

[73] Assignee: IMAX Systems Corporation, Toronto, Canada

[21] Appl. No.: 290,630

[22] Filed: Aug. 6, 1981

[51] Int. Cl.³ .............................................. G03B 1/00
[52] U.S. Cl. .................................................. 352/184
[58] Field of Search ........................................ 352/184

[56] References Cited

U.S. PATENT DOCUMENTS

| | | | |
|---|---|---|---|
| 3,494,524 | 2/1970 | Jones | 352/184 |
| 3,600,073 | 8/1971 | Shaw | 352/184 |
| 3,794,415 | 2/1974 | Jones | 352/184 |
| 3,944,349 | 3/1976 | Jones | 352/184 |
| 4,039,256 | 8/1977 | Teeple et al. | 352/184 |
| 4,114,996 | 9/1978 | Shaw | 352/184 |

Primary Examiner—Monroe H. Hayes
Attorney, Agent, or Firm—Rogers, Bereskin & Parr

[57] ABSTRACT

A film support element assembly is disclosed, primarily for supporting film in relation to a projection aperture in a motion picture projector having a rolling loop film transport mechanism. In a preferred embodiment the film support element is a so-called "field flattener" and has a cylindrically curved surface over which successive frames in the film are laid by the mechanism. Wiper elements are provided above and below the film path and the lens element can be displaced to bring a fresh portion of the surface into the film path. At the same time, the wiper elements remove debris from the surface. The wiper elements are removable for disposal of collected debris.

12 Claims, 5 Drawing Figures

FIELD FLATTENER LENS ELEMENT ASSEMBLY

This invention relates generally to film projectors, cameras and the like having a film transport mechanism of the type which has become known as the "rolling loop" mechanism. More specifically, the invention is concerned with a film support element assembly by which film is supported in relation to an aperture (e.g. a projection aperture) in an apparatus of this general type.

U.S. Pat. No. 3,494,524 to Jones discloses the principle of a rolling loop film transport mechanism. The mechanism includes a curved stator and a rotor which cooperate to define a passage through which the film is transported. The rotor has gaps in which loops of film are continuously formed as the rotor rotates. Each loop is developed by feeding film from an input sprocket into one of the rotor gaps as the gap travels from a film inlet location to the aperture, and the loop decays progressively as the gap travels from the aperture to a driven output sprocket. The film is projected or exposed (as the case may be) at the position of the aperture and is held in that position on a registration pin or pins. A number of improvements in the original Jones mechanism are disclosed in U.S. Pat. No. 3,600,073 to Shaw.

In a rolling loop film transport mechanism, the film typically conforms to the curvature of the stator at the position of the projection or exposure aperture. U.S. Pat. No. 3,794,415 (also to Jones) does disclose a proposal for permitting the film to adopt a flat configuration during projection but, at least in commercial projectors, it has been found preferable to allow the film to conform to the curvature of the stator at the position of the projection aperture. A lens element known as a "field flattener" supports the film at this position and has a cylindrically curved surface across which the film is laid; the curvature of this surface compensates for the curvature of the film and provides for proper projection of the image.

Normal practice is to position the field flattener in an opening in the stator so that the film frames are successively laid onto the cylindrical surface of the field flattener as the film moves through the projector. A problem with this arrangement is that particles of dust, film emulsion and other debris carried with the film tend to accumulate on the cylindrical surface of the field flattener element. The projection lens of the projector will be focused on the film immediately adjacent to that cylindrical surface so that particles on the surface will be almost in focus.

It has therefore been proposed to provide interchangeable field flattener elements so that a "dirty" element can be replaced with a clean element. In the projector disclosed in the Shaw patent disclosed above, the field flattener lens element is slideably received in a pair of vertical guides. The element is located against downward movement by a latch which can be released by a button at the top of the lens element holder positioned so that the latch is automatically released when a clean lens element is placed in the guides and moved downwardly. The "dirty" element is ejected downwardly from the guides and the clean element moves into its place. It has also been proposed to provide a wiper above the film path for wiping the cylindrical surface of the replacement lens element as it moves into place.

The arrangement disclosed in the Shaw patent has been found to operate very satisfactorily in practice while the projector is running, with a barely perceptible effect on the projected image. Nevertheless, to the practiced eye, it is possible to detect a black line moving across the projected image when the lens elements are changed.

An object of the present invention is to provide an improved film support element assembly intended to avoid this problem.

According to one aspect of the invention there is provided a film support element assembly for a projector, camera and like apparatus having a rolling film transport mechanism. The assembly is adapted to support the film in relation to an aperture of the apparatus and includes an elongate lens element having a film support surface across which successive portions of a film of known width can be laid during transportation of said film in a film transport path including said aperture. Means is provided supporting the lens element for movement in a direction generally normal to said path between first and second positions in which respectively different portions of said film support surface are disposed in the film path. First and second wiper elements extend transversely of and in contact with the film support surface on respectively opposite sides of the film path. The wiper elements are adapted to wipe the surface and trap debris upon movement of the lens element relative to the wiper elements. The wiper elements are removable for disposal of trapped debris. The film support surface of the lens element is continuous and of uniform cross-sectional shape. The surface has a length sufficiently in excess of twice the width of the film that movement of the lens element between its first and second positions will cause the relevant wiper element to traverse the entire axial extent of the portion of the film support surface moving out of the film path.

According to one embodiment of the invention; the lens element may be a field flattener having a cylindrically curved film support surface.

In practice, it has been found preferable for the length of the film support surface of the lens element to approximate two and a half times the width of the film. Provided the wiper elements are disposed fairly close to the film path, debris accumulated on the curved surface adjacent to but inwardly of one of the wipers will be removed by the other wiper when the lens element is moved to bring a fresh portion of its film support surface into the film path. Guiding surfaces for the top and bottom edges of the film are preferably provided on the lens element support means so that the film path is always accurately defined with respect to the axial direction of the lens element. However, such surfaces could alternatively be provided in the projector or other apparatus in which the lens element assembly is used.

In order that the invention may be more clearly understood, reference will now be made to the accompanying drawings which illustrate a preferred embodiment of the invention by way of example, and in which.

Figure 1:
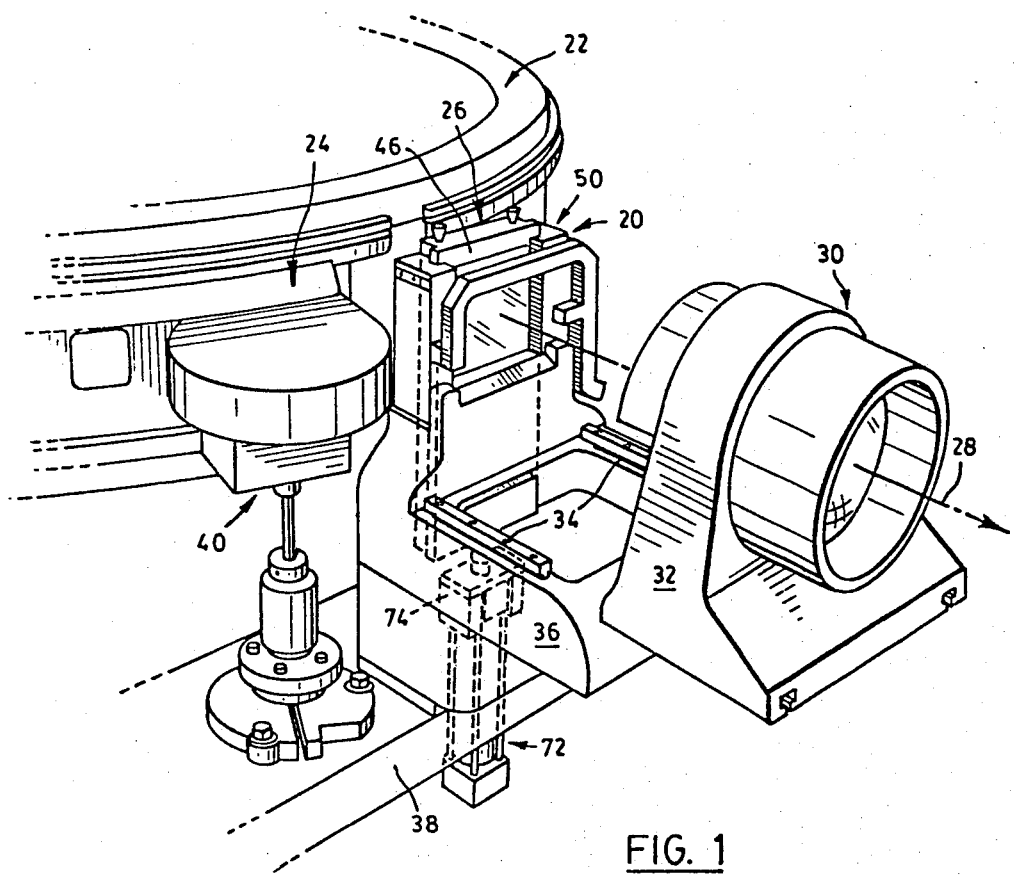
FIG. 1 is a perspective view, partly exploded, of part of a motion picture projector of the general form disclosed in the Shaw patent referred to above, but incorporating a film support element assembly of the present invention having a "field flattener" lens element.
Figure 3:
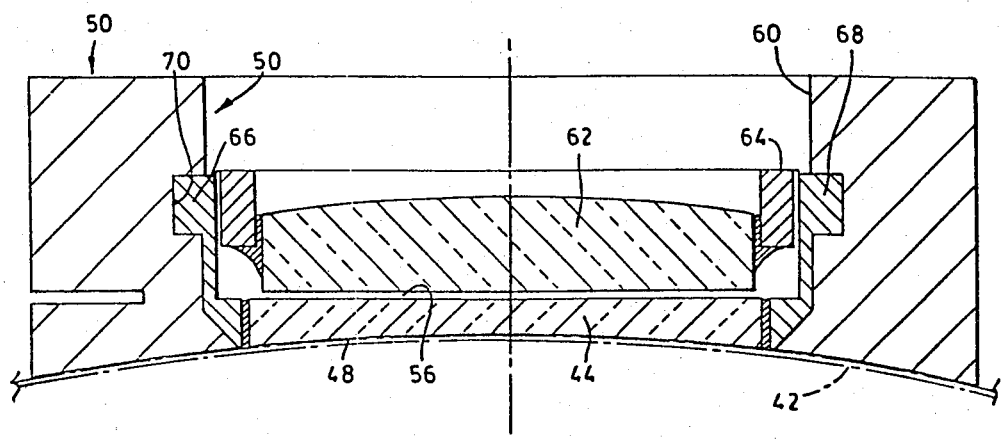
FIG. 3 is a planar horizontal sectional view on line III—III of FIG. 2.
Figure 2:
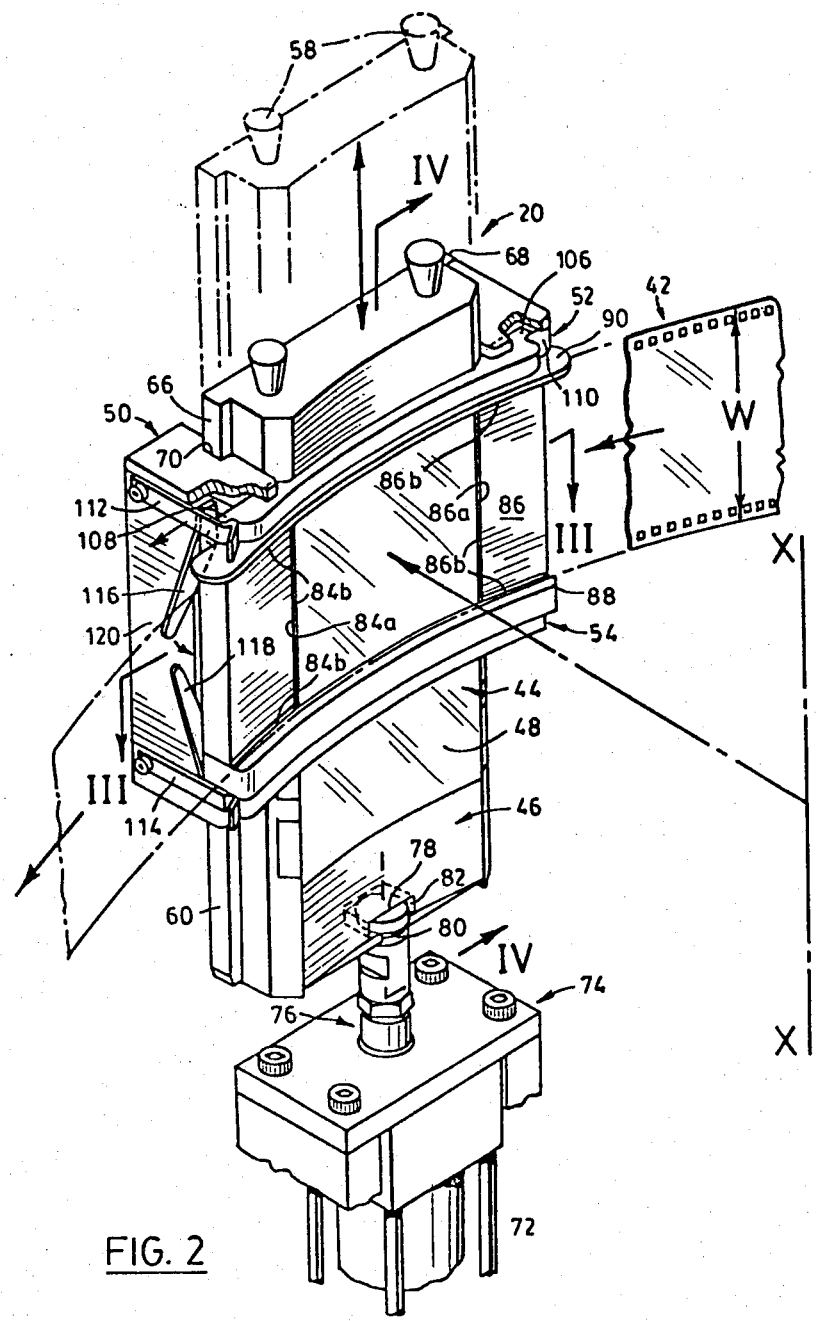
FIG. 2 is a perspective view of the lens element assembly of FIG. 1 but taken from the opposite side as compared with FIG. 1 and with associated structure omitted.

Referring first to FIG. 1, the film support element assembly provided by the invention is generally indicated by reference numeral 20 but is partly concealed by associated structure forming part of the projector proper; assembly 20 is better shown in FIG. 2. However, before referring to that view, it may be convenient to briefly describe the principal components of the projector shown in FIG. 1.

Reference may be made to the Shaw U.S. Pat. No. 3,600,073 for a complete description of the rolling loop film transport mechanism of the projector. For present purposes, it is sufficient to note that the projector includes a cylindrical rotor, part of which is visible at 22 in FIG. 1 and a stator, part of which is indicated at 24. These two components together define a film passage along which the film is transported by forming successive rolling loops in the film as described in the patent. Successive frames in the film are transported by the rolling loop mechanism to a projection aperture in the stator at the location indicated at 26 in FIG. 1. The film is not in fact visible in that view but can be seen in FIG. 2 (see later).

The projector includes a projection lamp and mirror arrangement by which light is projected through the projection aperture in the direction indicated by arrow 28. The light passes successively through the film, through the lens element assembly 20 and then through a projection lens assembly 30 by which the image on the film is focussed onto a screen. Assembly 30 includes a lens mount 32 which is shown partly exploded from the remainder of the projector in FIG. 1 and which is in fact received in guideways 34 in a lens mount saddle 36 so that the projection lens assembly can be adjusted back and forth for focusing purposes. Details of the adjustment mechanism have not been shown since they form no part of the present invention.

Lens mount saddle 36 is secured to the frame of the projector, part of which is indicated at 38, and is itself shaped to provide a housing for the field flattener lens element assembly 20 and to support that assembly adjacent to stator 24. Also shown mounted on frame 38 is a cam unit 40, the purpose of which is to decelerate the moving film in the region of the projection aperture 26 so that the film is arrested and held stationary in the vicinity of the projection aperture 26 for projection of each frame. Cam unit 40 is essentially the same as the corresponding unit described and illustrated in the Shaw patent and will not therefore be described in detail.

Referring now to FIG. 2, the film support element assembly is shown as it would be seen from the side which is closest to the stator in the assembled projector; that is, the opposite side as compared with FIG. 1. A length of film is indicated in ghost outline at 42 in FIG. 2 and is shown generally in the path the film would normally adopt during transportation past assembly 20, although it should be noted that loops such as would normally be formed in the film during transportation have not been shown.

Assembly 20 includes an elongate film flattener lens element 44 supported in a housing or body 46. Element 44 has a cylindrically curved surface 48 which extends about an imaginary axis represented at X—X in FIG. 2. In fact, axis X—X corresponds to the rotational axis of the rotor 22 and the axis of the stator 24 so that the curvature of surface 48 corresponds to the curvature of the film passage defined between the rotor and the stator. Film 42 is transported in a path extending generally transversely with respect to axis X—X and successive portions of the film are laid across surface 48 during such transportation as described in the Shaw patent.

Element 44 is supported for movement in the direction of axis X—X between first and second positions in which respectively different portions of its curved surface 48 are disposed in the film path. This support is provided by the lens element housing 46 and by a so-called aperture block 50 in which the housing is slidably mounted. Housing 46 is shown in a lower position in full lines in which an upper portion of the curved surface 48 is in the film path, and in ghost outline in an upper position, in which a lower portion of surface 48 would be behind the film.

Wiper elements generally indicated at 52 and 54 are provided respectively above and below the film path and are supported by the aperture block 50. The elements are shown in more detail in FIGS. 4 and 5 (to be described) and are disposed in contact with the lens element surface 48 so as to wipe the surface and trap debris which has accumulated thereon, upon movement of the lens element relative to the wiper elements. The lens elements are removable for the disposal of trapped debris as will be more particularly described later.

The cylindrically curved surface 48 of the lens element is continuous and is of uniform cross-sectional shape throughout its length so that up and down movement of the element has no effect whatever on the image being projected by the projector. In this particular embodiment, the axial length of surface 48 is approximately two and a half times the width W of film 42. This ensures that the entire axial extent of the portion of surface 48 which is moving out of the film path (the "dirty" portion is wiped by the relevant wiper element). Thus, the axial length of element 48 should be sufficient to ensure that this occurs otherwise debris remaining on that portion of the lens element would be transferred back into the path of the film the next time the lens element were moved in the opposite direction.

In this embodiment, the field flattener lens element is formed in one piece and is made of fused silica optical grade No. 1 quartz. In an alternative embodiment, the element could be made in sections cemented together so as to form the continuous cylindrical surface 48.

Figures 4, 5:
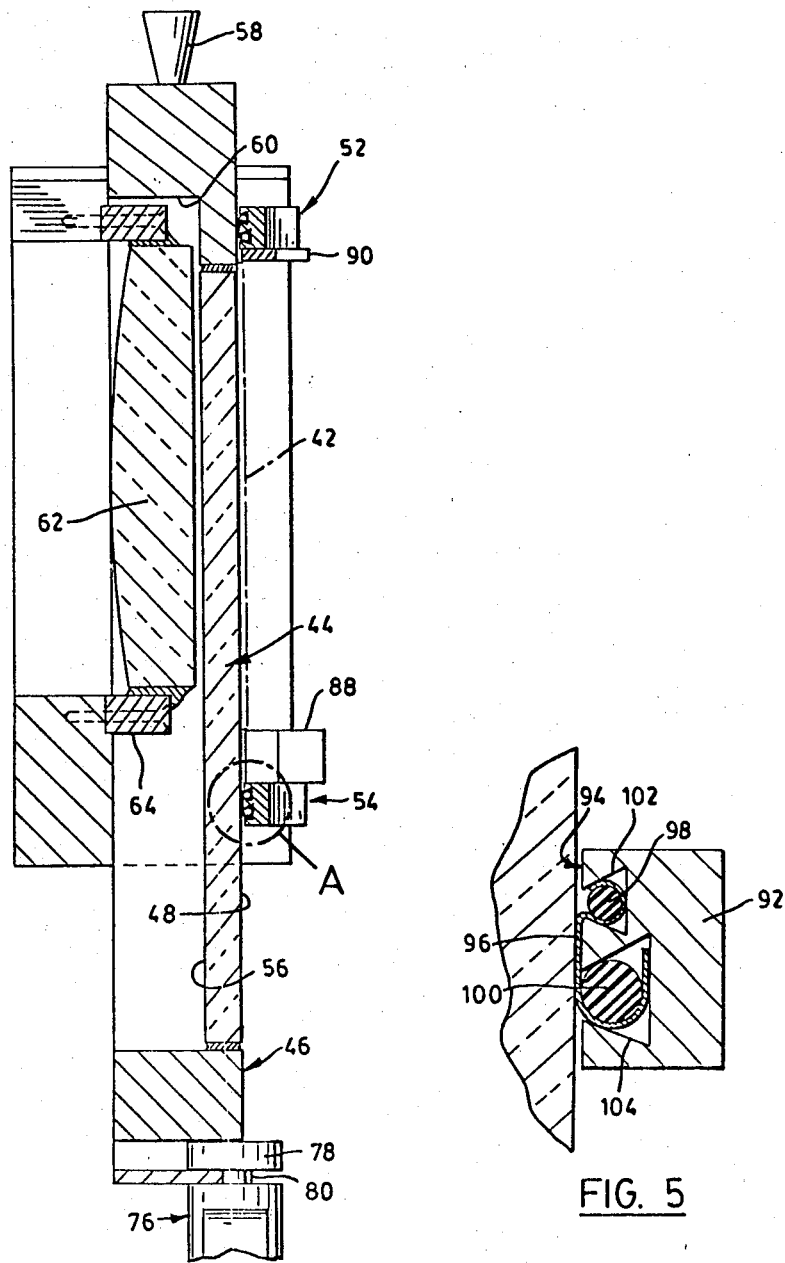
FIG. 4 is a vertical sectional view on line IV—IV of FIG. 2.
FIG. 5 is a detail view of the part of FIG. 4 indicated at A.

FIG. 4 shows the lens element assembly in vertical section and it will be seen that element 44 is relatively thin and has a flat inner surface 56. The element is cemented in a suitably shaped opening in its housing 46 and the front surface of the housing is shaped to correspond with the curvature of element surface 48 (see FIG. 2). Two knobs 58 protrude from the top of housing 46 for facilitating handling of the lens element, e.g. during its assembly into block 50.

Referring back to FIG. 4, it will be seen that housing 46 defines a recess 60 behind the lens element. This recess receives a spherical lens element 62 which cooperates with element 44 during projection of the film to provide the optical characteristics required in the projector. Element 62 is stationary and does not move with lens element 44. Recess 60 therefore extends over the full length of element 44 so that spherical element can be accommodated in any axial position of element 44. Element 62 is circular in shape and is cemented into a suitable lens mount 64 which is bolted to a part of aperture block 50 behind the cylindrical lens housing 46 as seen in FIG. 2.

Referring back to FIG. 2, it will be seen that housing 46 is shaped to define longitudinal ribs 66 and 68, one on each side which form guides received in complimentary guideways, one of which is indicated at 70, for permitting vertical sliding movement of housing 46 with respect to aperture block 50.

In the illustrated embodiment, an air cylinder 72 is provided for effecting vertical sliding movement of housing 46 although it will of course be understood that this is optional. In an alternative embodiment, manual operation could be employed. In any event, air cylinder 72 is supported by suitable brackets generally indicated at 74 secured to the frame of the projector below the lens mount saddle 36 (see FIG. 1). The air cylinder has a piston rod 76 which protrudes from the top bracket 74 (see FIG. 2) and which is provided at its outer end with a fitment including a head 78 having a depending neck 80. The fitment is received in a suitably dimensioned T-shaped slot 82 adjacent the lower end of holder 46. Slot 82 is open at both sides so that the holder can be detached from the piston at appropriate times. The stroke of cylinder 72 is selected to provide for movement of lens element 44 substantially between its extreme end positions. A suitable pneumatic supply and control will of course be provided for air cylinder 72. Typically, a manual control arrangement will be provided so that the projector operator can simply move the lens element when he notices that the projected image is being affected by debris.

Aperture block 50 is an assembly of individual components and substantially completely encloses the lens element 44 and its holder 46 except for a front portion between the wiper elements 52 and 54 where the curved surface of element 44 is exposed. On opposite sides of this surface are portions 84 and 86 of the aperture block which are recessed as indicated at 84a and 86a respectively to leave lands 84$^b$ and 86$^b$ against which marginal areas of the film frames are supported during film transportation. Lands 84$^b$ and 86$^b$ are hard chromed. Below portions 84, 86 is a ledge or shoulder 88 which forms a guiding surface for the bottom edge of the film. A corresponding plate 90 extends parallel to shoulder 88 and forms a guiding surface for the upper edge of the film. The wiper elements 52 and 54 are disposed adjacent to and outwardly of these respective surfaces. The wiper elements are shown in section in FIG. 4 and are essentially the same as one another. FIG. 5 is an enlarged sectional view of element 54 and it will be seen that the element includes an elongate housing 92 having an inner surface 94 which is curved in conformity with the curvature of the curved surface of lens element 44. Extending across part of surface 94 is a section 96 of absorbant material selected to remove and retain particles of film emulsion and other debris. Specifically, the material may be 3M film cleaning tissue. The material is held in place by two resilient strips 98 and 100 pressed into respective recesses 102 and 104 which open into surface 94 and by which the material is trapped. The recesses extend over the entire length of housing 92 and are undercut so that the strips 100 and 102 have to be distorted in moving into and out of the respective recesses. The recesses are spaced in the direction of movement of the lens element 44 so as to resist accidental dislodgement of the cleaning material during movement of the lens element. At the same time, the cleaning material can be readily removed by prying the strips from the recesses using a suitable tool. The material will then be discarded and replaced by fresh material. In assembling the wiper element, the strips 98, 100 are in fact installed so that strip 100 holds the cleaning material slightly clear of surface 94 so that the material is resiliently supported.

The wiper elements themselves are of course removable from aperture block 50 for this purpose. Referring back to FIG. 2, it will be seen that the elements are received in respective recesses in block 50 and normally retained by releasable spring clips. Thus, referring to the upper wiper element by way of example, it will be seen that the element is shaped to define respective recesses 106 and 108 adjacent its ends. One of these recesses receives a fixed projection 110 on aperture block 50 while the other recess receives a detent formed adjacent the outer end of a leaf-spring 112 secured to the aperture block. A corresponding spring for the lower wiper element is denoted 114. The springs can each be deflected outwardly by respective release levers 116 and 118, each of which is pivotted in a slot in block 50 so that, by depressing the lever (as indicated by arrow 120 in the case of lever 116), the opposite end of the lever will pivot outwardly and release the associated leaf-spring. The wiper element can then of course be removed, its cleaning tissue replaced and the wiper element simply snap-fitted back into aperture block 50.

It will of course be appreciated that the embodiment described above is given by way of example only and that many modifications are possible within the broad scope of the invention. For example, the field flattener lens element could be arranged to be manually displaceable as discussed above. Where a spherical lens element is required in association with the field flattener lens element, the particular arrangement described can be varied. The spherical lens element could be completely separate from the field flattener lens element assembly. The leaf springs 112, 114 could of course be replaced by spring-loaded latches.

Another possible modification would be to provide means for vibrating the field flattener lens element to assist in dislodging debris.

It will also be appreciated that while the invention has been described primarily in connection with a projector of the general type disclosed in the Shaw patent referred to above, there is no limitation in this respect. Where a field flattener lens element is required in some other form of rolling loop type of projector or in a camera or other similar apparatus, the assembly provided by the invention may also be used. Such an assembly will normally be used in a motion picture film apparatus although within the broad scope of the invention, the assembly could be used with a still camera or projector. Further, it should be noted that the assembly provided by the invention may find application in an environment in which the film lies flat during exposure or projection (as the case may be). For example, as disclosed in U.S. Pat. No. 3,794,415 (Jones). In that case, the lens element of the assembly would have a generally flat outer face for supporting the film and would not in fact act as a field flattener.

It is also to be noted that cleaning means other than wiper elements of the form specifically described above may be employed. Wiper elements moveable transversely with respect to the direction of movement of the film support element (i.e. parallel to the direction of film movement) may be provided. For example, two wiper elements could be mounted on respectively opposite sides of the film path and each arranged to wipe transversely across a "dirty" portion of the film support surface of the lens element at appropriate times. This movement of the wiper elements may be effected under the control of individual actuating means such as air cylinders. In other embodiments jets of cleaning fluid (e.g. air or a suitable liquid) may be employed as a cleaning means either alone or in combination with wiper elements. In some cases, cleaning means need be provided at one side of the film path only.

I claim:

1. A film support element assembly for a projector, camera and like apparatus having a rolling loop film transport mechanism, the assembly being adapted to support a film in relation to an aperture of said apparatus and comprising:
   an elongate lens element having a film support surface across which successive portions of a film of known width can be laid during transportation of said film in a film transport path including said aperture;
   means supporting said lens element for movement in a direction generally normal to said path between first and second positions in which respectively different portions of said film support surface are disposed in said film path; and,
   first and second wiper elements extending transversely of and in contact with said film support surface on respectively opposite sides of said film path, said elements being adapted to wipe said surface and trap debris which has accumulated thereon, upon movement of the lens element relative to said wiper elements, and said wiper elements being removable for disposal of trapped debris;
   said film support surface of the lens element being continuous and of uniform cross-sectional shape and having a length sufficiently in excess of twice the width of the film that said movement of the lens element between its first and second positions will cause the relevant wiper element to traverse the entire extent of a said portion of the film support surface moving out of said film path.

2. An assembly as claimed in claim 1, wherein said lens element is a field flattener and wherein said film support surface is cylindrically curved about an axis corresponding to the axis of curvature of the film at the position of said aperture.

3. An assembly as claimed in claim 2, wherein said means supporting the lens element comprises a housing in which said lens element is carried with said cylindrically curved surface exposed, and a mounting block adapted to be secured in said apparatus in a fixed position with respect to said film, said housing being slidably received in said mounting block for movement between said first and second positions, and said mounting block defining an opening across which said film is transported in use and through which said cylindrically curved surface of the field flattener lens is exposed to said film, and surfaces on respectively opposite sides of said opening curved to form continuations of said cylindrically curved surface.

4. An assembly as claimed in claim 3, further comprising film guide means on said mounting block defining guiding surfaces for the respective upper and lower edges of said film disposed respectively above and below said aperture and defining said film path.

5. An assembly as claimed in claim 4, wherein said wiper elements extend transversely of said aperture block outwardly of and adjacent to said guiding surfaces and adjacent respective top and bottom ends of said aperture block.

6. An assembly as claimed in claim 5, wherein each said wiper element includes an elongate body having an inner surface curved to conform with said cylindrically curved surface of the field flattener lens element, said body being adapted to support a lens cleaning material extending across said inner surface for contact with said cylindrical surface of the lens element, and wherein said body includes respective locating recesses at opposite ends thereof, and wherein said aperture block includes a fixed projection engageable in one of said recesses and a releaseable retaining element engageable in the recess at the opposite end of said body.

7. An assembly as claimed in claim 6, wherein said releaseable retaining element comprises latch means having a first end secured to said mounting block and a second end defining a detent engageable in said locating recess in the wiper element, and wherein the mounting block is further provided with a lever pivotally mounted in a recess in said block and having an end portion disposed to eject said latch means from said recess in the wiper element body in response to pivotal movement of the lever under manual control.

8. An assembly as claimed in claim 6, wherein each said wiper element body includes two spaced elongate recesses extending longitudinally of said body inner surface, wherein said lens cleaning material comprises a section of film cleaning tissue having respective portions receivable in said recesses with the intervening portion of said tissue section extending across said inner surface of the body between said recesses, and wherein said tissue is retained in said recesses by resilient retaining elements removably engaged in said recesses and trapping said tissue therein.

9. An assembly as claimed in claim 3, in combination with a fluid pressure operated actuating cylinder unit including a piston rod adapted to be coupled to said lens element holder so as to extend substantially parallel to said axis, and a cylinder adapted to be secured to said apparatus so that operation of said piston will cause movement of said lens element between said first and second positions.

10. An assembly as claimed in claim 3, wherein said lens element housing is formed with a recess at a rear side thereof, and wherein said assembly further comprises a spherical lens element disposed in said recess behind said film path and coupled to said mounting block, said recess being shaped to permit movement of the lens element housing for movement of said lens between said first and second positions while permitting said spherical lens element to remain stationary.

11. In a projector, camera and like apparatus having a rolling loop film transport mechanism including a stator and a rotor adapted to co-operate to form continuous rolling loops in said film and to cause transportation thereof through the apparatus along a film path including an aperture,
   the improvement comprising:
   a film support disposed at the posterior of said aperture of said aperture and comprising: an elongate field flattener lens element having a cylindrically curved surface extending about an axis and across which successive portions of said film are laid during transportation of said film along said film path;

means supporting said lens element for movement in the direction of said axis between first and second positions in which respectively different positions of said curved surface are disposed in said film path; and, first and second wiper elements extending transversely of and in contact with said curved surface of the lens element on respectively opposite sides of said film path, said elements being adapted to wipe said surface and trap debris which has accumulated thereon, upon movement of the lens element relative to said wiper elements, and said wiper elements being removable for disposal of trapped debris; said cylindrically curved surface of the lens element being continuous and of uniform cross-sectional shape and having an axial length sufficiently in excess of twice the width of the film that movement of the lens element being its first and second positions will cause the relevant wiper element to transverse the entire axial extent of a said portion of the curved surface moving out of the film path.

12. A film support element assembly for a projector, camera and like apparatus having a rolling loop film transport mechanism, the assembly being adapted to support a film in relation to an aperture of said apparatus and comprising:

an elongate lens element having a film support surface across which successive portions of a film of known width can be laid during transportation of said film in a film transport path including said aperture;

means supporting said lens element for movement in a direction generally normal to said path between first and second positions in which respectively different portions of said film support surface are disposed in said film path;

said film support surface of the lens element being continuous and of uniform cross-sectional shape and having a length sufficiently in excess of twice the width of the film that said movement of the lens element between its first and second positions will cause a portion of said film support surface in said path to move to a position adjacent to and clear of said path; and, cleaning means adapted to remove debris from a said portion of said film support surface which has been moved out of said path.

* * * * *